United States Patent
Swenson et al.

(10) Patent No.: US 7,056,041 B2
(45) Date of Patent: Jun. 6, 2006

(54) ENCODER STRIP DAMAGE DETECTOR

(75) Inventors: Samuel K. Swenson, Boise, ID (US); Ryan Christensen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/007,541

(22) Filed: Dec. 7, 2004

(65) Prior Publication Data
US 2005/0084311 A1   Apr. 21, 2005

Related U.S. Application Data

(63) Continuation of application No. 10/268,516, filed on Oct. 10, 2002, now Pat. No. 6,907,356.

(51) Int. Cl.
*B41J 21/16* (2006.01)

(52) U.S. Cl. .................. 400/279; 400/283; 347/19; 702/35

(58) Field of Classification Search ........... 347/12–19, 347/37, 43; 400/279, 283, 320–323; 702/33–35
See application file for complete search history.

(56) References Cited

U.S. PATENT DOCUMENTS

| | | | | |
|---|---|---|---|---|
| 5,563,591 A | * | 10/1996 | Jacobs et al. | 341/13 |
| 5,803,628 A | * | 9/1998 | Donahue | 400/279 |
| 6,267,466 B1 | * | 7/2001 | Gudaitis et al. | 347/37 |
| 6,371,593 B1 | | 4/2002 | Li et al. | |
| 6,499,827 B1 | | 12/2002 | Elgee | |

* cited by examiner

*Primary Examiner*—Minh Chau

(57) ABSTRACT

A method and apparatus for detecting a damaged encoder strip are described. An encoder strip is scanned in two separate operations at two separate times, a first operation and a second operation. The number of markings sensed in each separate operation is counted. A circuit compares the count of markings in each separate operation. If the count differs between the two operations, the circuit determines that the encoder strip is damaged, and the circuit develops a signal indicating this damage. In an embodiment, the first operation is performed during a calibration, and the second operation is performed during a power-on, or upon operator command.

13 Claims, 5 Drawing Sheets

ENCODER STRIP DAMAGE DETECTOR

RELATED APPLICATIONS

This is a continuation of and claims priority to U.S. patent application Ser. No. 10/268,516 filed Oct. 10, 2002, now U.S. Pat. No. 6,907,356 entitled "Encoder Strip Damage Detector" by inventors Samuel K. Swenson and Ryan Christensen.

TECHNICAL FIELD

The invention relates to methods and systems for detecting a damaged encoder strip.

BACKGROUND

Many devices make use of an encoder strip. A swath type printing device, for example, has a print mechanism that travels along a scan-axis across a print medium in order to print a row of markings on the medium. To print fully on a sheet of the medium, the print mechanism commonly travels a multiple number of times along the scan-axis, each time printing a separate set of rows.

The print mechanism conventionally determines its position along the scan-axis by referencing position markings on a printer encoder strip. A sensing device senses encoder strip markings as the print mechanism travels along the printer scan-axis. The sensing device is usually part of or attached to the print mechanism, and therefore travels along the scan-axis with the print mechanism. The encoder strip is usually stationary. Circuitry or logic within the printer interfaces with the sensing device to determine actual positions of the print mechanism relative to the stationary encoder strip.

A printing device may either be pre-programmed with the extent of its feasible travel along the scan-axis, or may alternatively initialize the extent of its feasible travel along the scan-axis in a calibration procedure. During such a calibration procedure, the printer scans the encoder strip to determine the number of encoder strip markings, and from this information determines the extent of the print mechanism travel along the scan-axis.

Over time, the number of encoder strip markings that can be detected may change as a result of degraded or absent markings on the encoder strip. As a result of this changed number of sensed markings, the position of the print mechanism along the scan-axis cannot be accurately determined, the print mechanism cannot therefore be accurately positioned, and the printing quality of the printing device can be degraded.

SUMMARY

A method and an apparatus to detect a damaged encoder strip are described. In one embodiment, an encoder strip reader scans the encoder strip at two separate times. A circuit counts the number of markings sensed in each separate scanning. A circuit compares the counts in each of the scannings. If the counts differ, a circuit concludes that the encoder strip is damaged.

Figure 1:
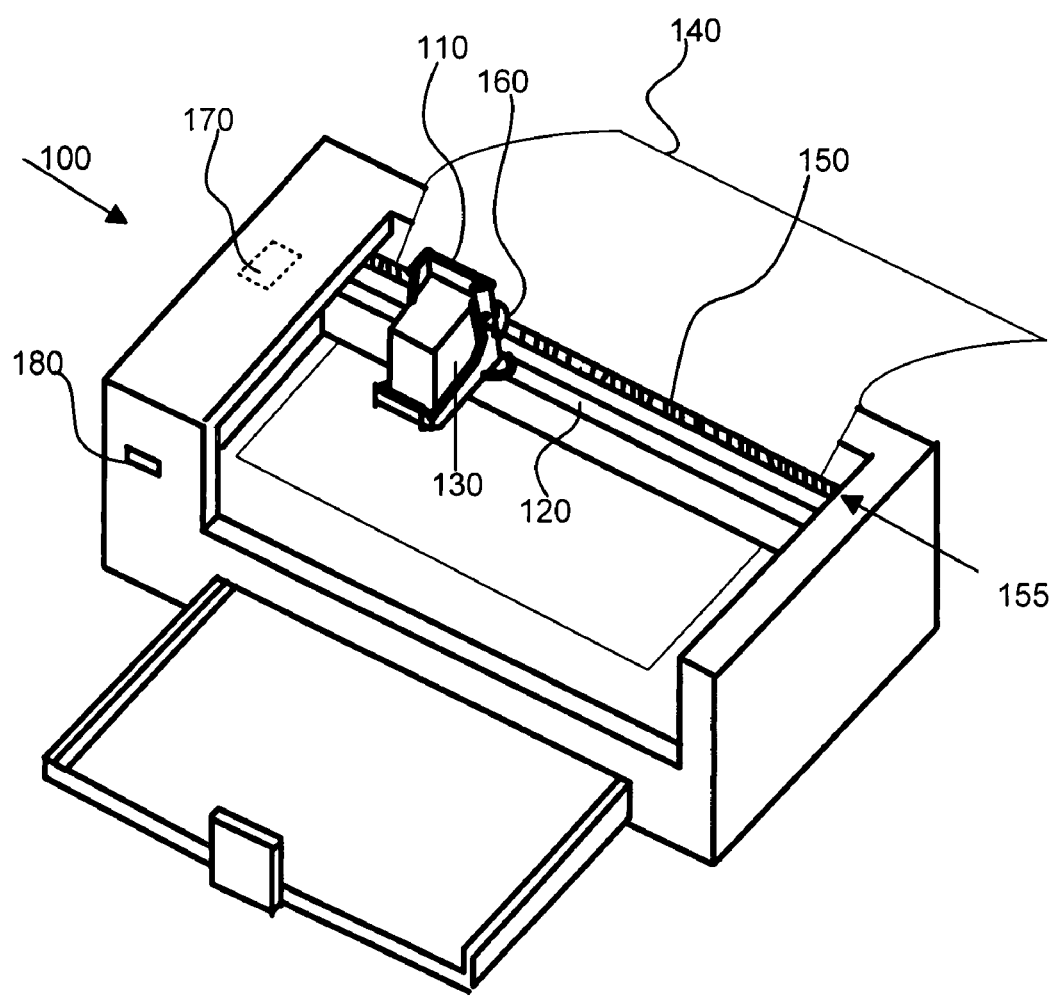
FIG. 1 shows an exemplary printing device that has an encoder strip damage detector.

Before one embodiment is explained in detail, it is to be understood that the printing device is not limited in its application to the details or construction and the arrangements of components set forth in the following description or illustrated in the drawings. The invention is capable of other implementations and of being practiced or being carried out in various ways. Also, it is to be understood that the phraseology and terminology used herein is for the purpose of description and should not be regarded as limiting. The scope of the claims is not limited to their literal terms but instead embraces all equivalents of the claims.

DETAILED DESCRIPTION

Throughout this patent, such terms as "damage," "damaged," "anomalous," "anomaly," and "changed" are used to refer to encoder strip markings that cannot be sensed because their presence for sensing is below a sensor threshold. These words are used interchangeably, and indicate an impairment in an at least one marking that will affect the sensing of the marking, and thus the proper positioning of a printer carriage assembly.

Referring to FIG. 1, an embodiment of a printing device 100 includes a moveable carriage assembly 110 configured to move along an at least one guide rail 120. Guide rail 120 is juxtaposed along an image forming area of a print medium 140. The print medium 140 has a surface upon which an image is to be formed by the printer. The print medium may include paper, vellum, any of various types of plastic film, and the like.

The carriage assembly 110 includes a print mechanism 130 having elements that apply an image to the print medium. The carriage assembly 110 and its print mechanism 130 move along guide rail 120. The axis defined by the carriage assembly movement is referred to herein as the "scan-axis" of the printing device 100.

During printing, the print mechanism 130 translates across the print medium along the scan-axis to form one line or swath of pixels across the print medium 140. In a shuttle-type printing device, the print mechanism 130 moves on a shuttle.

After forming an image line or swath of pixels on the print medium 140, the print medium 140 is conventionally moved in an orthogonal direction to the scan-axis to be in a position to accept another line or swath of pixels from the print mechanism 130. In this way, an entire image is formed on the print medium 140.

In order to form an image at a correct position on the print medium 140, the carriage assembly 110 is precisely positioned on the guide rail 120 along the scan-axis. The printing device includes an encoder strip 150 (commonly also called a code strip) that facilitates positioning of the carriage assembly. The encoder strip serves as a position reference for the print mechanism 130 during its translation along the guide rail 120. The encoder strip 150 is disposed on or along the scan-axis of printing device 100, near the path of the carriage movement along the guide rail 120. The encoder strip 150 is attached to a stationary portion of the printing device, or reeled and strung about a pivot, so that it embodies a rigid entity with respect to a sensor (encoder strip reader) 160, to be disclosed presently.

The encoder strip 150 includes multiple sequential and closely spaced markings 155 along the scan-axis. The number and spacing of the markings 155 depend on the particular implementation. The encoder strip markings 155 can be marks each indistinguishable from any other marking 155 on the encoder strip 150. It is also within the specific contemplation of the invention that the markings are each individually distinguishable (i.e. unique) indicia.

An encoder strip reader 160 is in a known position relative to the print mechanism 130, and can sense the markings 155 on the encoder strip 150.

In an implementation, the encoder strip 150 is transparent. The markings 155 are distinguished from the translucent encoder strip 150 by having a more opaque quality than the encoder strip 150. The encoder strip reader 160 reads the encoder strip 150 by shining a light from a light source onto the encoder strip and sensing the light transmitted through the encoder strip 150 by a light sensor disposed to receive the transmitted light that passes through the encoder strip 150. In an implementation, the encoder strip 150 is a relatively translucent material, and the markings 155 are relatively opaque, commonly configured as tick marks. In another specific implementation, the encoder strip 150 is a light reflective material, and the markings 155 are configured to absorb light. The light source and the light sensor are each positioned near the same surface of the encoder strip 150 so that the light sensor captures a reflection of light from the encoder strip 150, rather than a transmission of light through the encoder strip 150.

In operation, the encoder strip reader 160 senses a segment of the encoder strip 150. The particular segment that is sensed is a function of the present position of the print mechanism 130 along the scan-axis. The encoder strip reader 160 forms a signal based on the sensed segment of the encoder strip 150. In an embodiment, the output signal from the encoder strip reader 160 indicates the sensed light, and a control circuit 170 determines from the output signal the identity or non-identity of an markings 155 on the encoder strip 150. The control circuit 170 interprets the position of the carriage assembly 110/print mechanism 130 from the output signal. The control circuit 170 controls the position of the carriage assembly 110/print mechanism 130 along the scan-axis based on the interpreted position of the carriage assembly 110/print mechanism 130 along the encoder strip 150.

The position of the print mechanism 130 is determined relative to some reference point on the encoder strip 150. In an implementation of an encoder strip 150, the control circuit 170 determines where the print mechanism 130 is along the encoder strip by counting the markings 155 from the reference point, and by keeping track of the count from that reference point. The control circuit 170 includes an encoder strip damage detector to determine whether the encoder strip 150 is damaged based on changes in a count of the markings detected by the encoder strip reader 160 over time. In one implementation, the control circuit 170 operates to count (first count) the markings that are detected by the reader 160 when the print mechanism 130 is translated from a first position (position "A") to a second position (position "B"). Subsequently, the control circuit 170 operates to count (second count) the markings detected by the reader 160 when the print mechanism 130 is translated again from position "A" to position "B". If the two counts are different, then the control circuit 170 determines that the encoder strip 150 is damaged.

The light source can be implemented as a light emitting diode (LED) and the light sensor can be implemented as a photo-diode light sensor. The light sensor receives less light transmitted through a marking 155 of an encoder strip 150 than transmitted through a non-marking area. Thus, using a specified light sensing threshold, the encoder strip reader 160 and control circuit 170 distinguish a marking from a non-marking based on the difference in passed light sensed. The light sensor alternatively converts the presence and absence of a marking 155 into an electrical signal to be processed by the control circuit 170, or transmits an electrical signal indicating the amount of transmitted light or the like to be processed by the control circuit 170.

As alternative embodiments, the markings 155 can be implemented using non-optical means. For instance, the markings can be magnetically distinguishable markings to be magnetically sensed by the encoder strip reader 160, tactically distinguishable markings to be mechanically sensed by the encoder strip reader 160, and the markings can be sensed in another manner.

The printing device 100 may also include a status indicator 180 that is responsive to control circuit 170 to instruct a user that an anomalous condition on the encoder strip 150 has been detected. The status indicator 180 emits an indication or other notification in response to receiving a signal from the control circuit 170, indicating the anomalous condition on the encoder strip 150. The status indicator 180 in one implementation comprises at least one lighting device such as an LED. In one implementation, the printing device 100 includes an output to a service function for downloading during operation of an encoder strip 150 anomalous condition data. A service function is a system to collect and/or disseminate data to a user and/or another system about printing device damage and service conditions.

Figure 2:
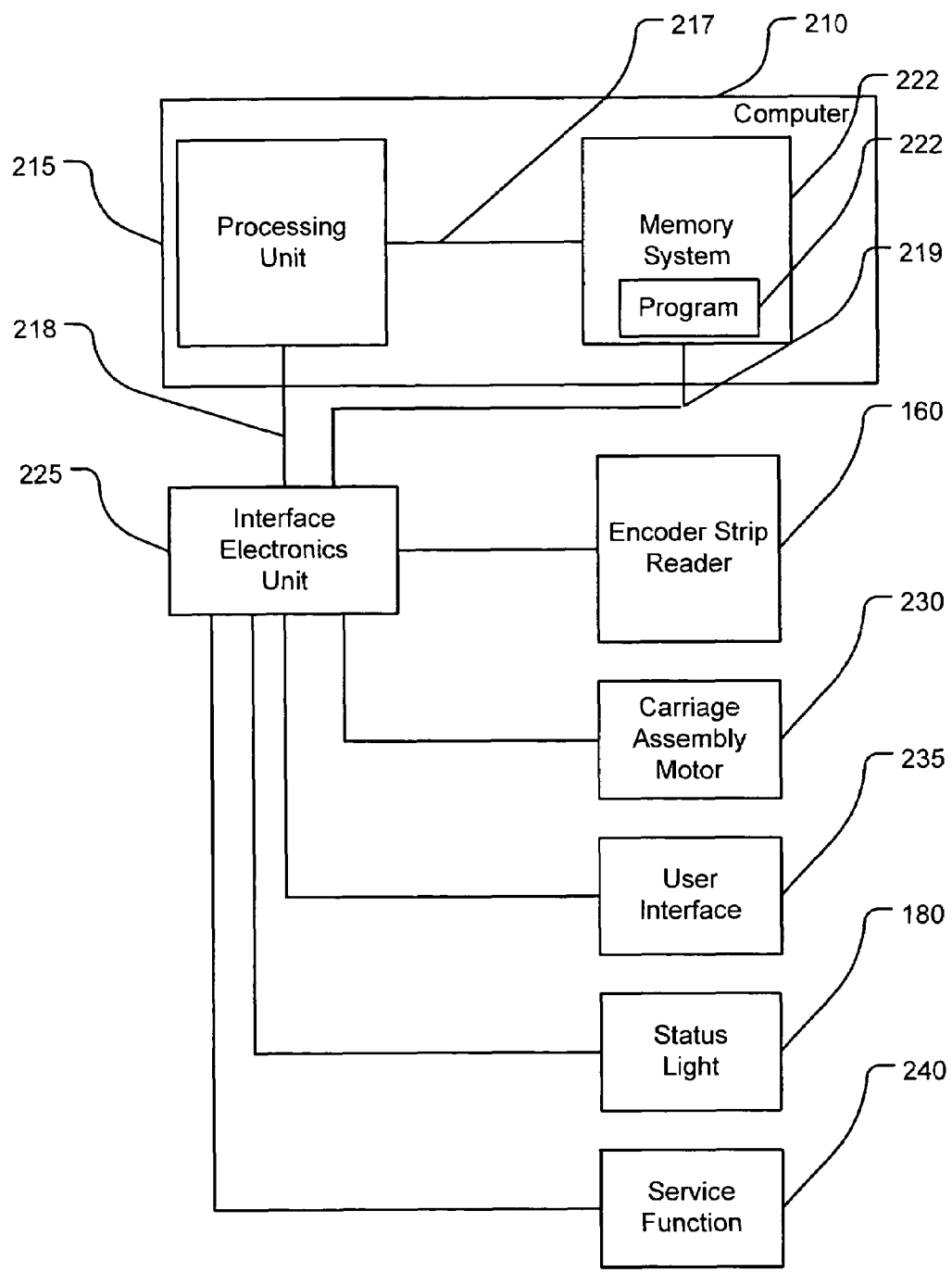
FIG. 2 is a block diagram showing selected components of an exemplary implementation of a printing device computer.

Referring now to FIG. 2, the logical functionality of the control circuit (170 FIG. 2) may be implemented in whole or in part by a computer 210. The computer 210 includes a processing unit 215 having at least one processor to execute a program 222 stored in a memory system 220, coupled to each other by a bus 217. The program 222 includes instructions that the processing unit 215 executes to implement the encoder strip damage detector.

The memory system 220 includes non-volatile memory to store and read the program such as an electrically erasable programmable read-only memory (EEPROM) or a flash memory (flash RAM). The memory system 220 also has writable memory to store, write, and read data such as a random access memory (RAM), an EEPROM, or a flash memory. The writable memory in many cases is volatile.

The computer 210 includes a bus 218 that couples the processing unit 215 to an interface electronics unit 225. The exemplary computer 210 also includes a bus 219 that couples the interface electronics unit 225 directly to the memory system 220. The interface electronics unit 225 in turn is coupled to printing device components that include the encoder strip reader 160, a carriage assembly translation motor 230 (commonly a step motor), a user input interface 235, the status indicator 180, and the service function 240.

The interface electronics unit 225 provides an indication to the computer 210 of the markings 155 sensed by the encoder strip reader 160. The encoder strip reader 160 provides to the computer 210 through the interface unit 225 a signal that indicates the sensed portion of the encoder strip 150. The processor unit 215, in response to executing the program 222 stored in the memory system 220, determines if a marking is being sensed, and counts the markings. The computer 210 provides to the interface electronics unit 225 a signal indicating that the encoder strip reader 160 is to sense the encoder strip 150.

The computer 210 provides to the interface electronics unit 225 an indication for the translation motor 230 to translate or shuttle the carriage assembly 110 on the guide rail 120 along the scan-axis. The interface electronics unit 225 provides to the computer 210 an input from the user input interface 235 indicating a user-activated switch(es) activation to perform an at least one step of the encoder strip damage detector process. The encoder strip damage detector process is to be presently described with reference to FIG. 3. The computer 210 provides to the interface electronics unit 225 outputs to the status indicator 180, the service function 240 and the like, indicating that the encoder strip 150 is damaged. The printing device computer 210 receives and sends other inputs and outputs from and to other ports and units not presently described (such as a control signal to a print engine, or a data input from a coupled print data source computer).

Figure 3:
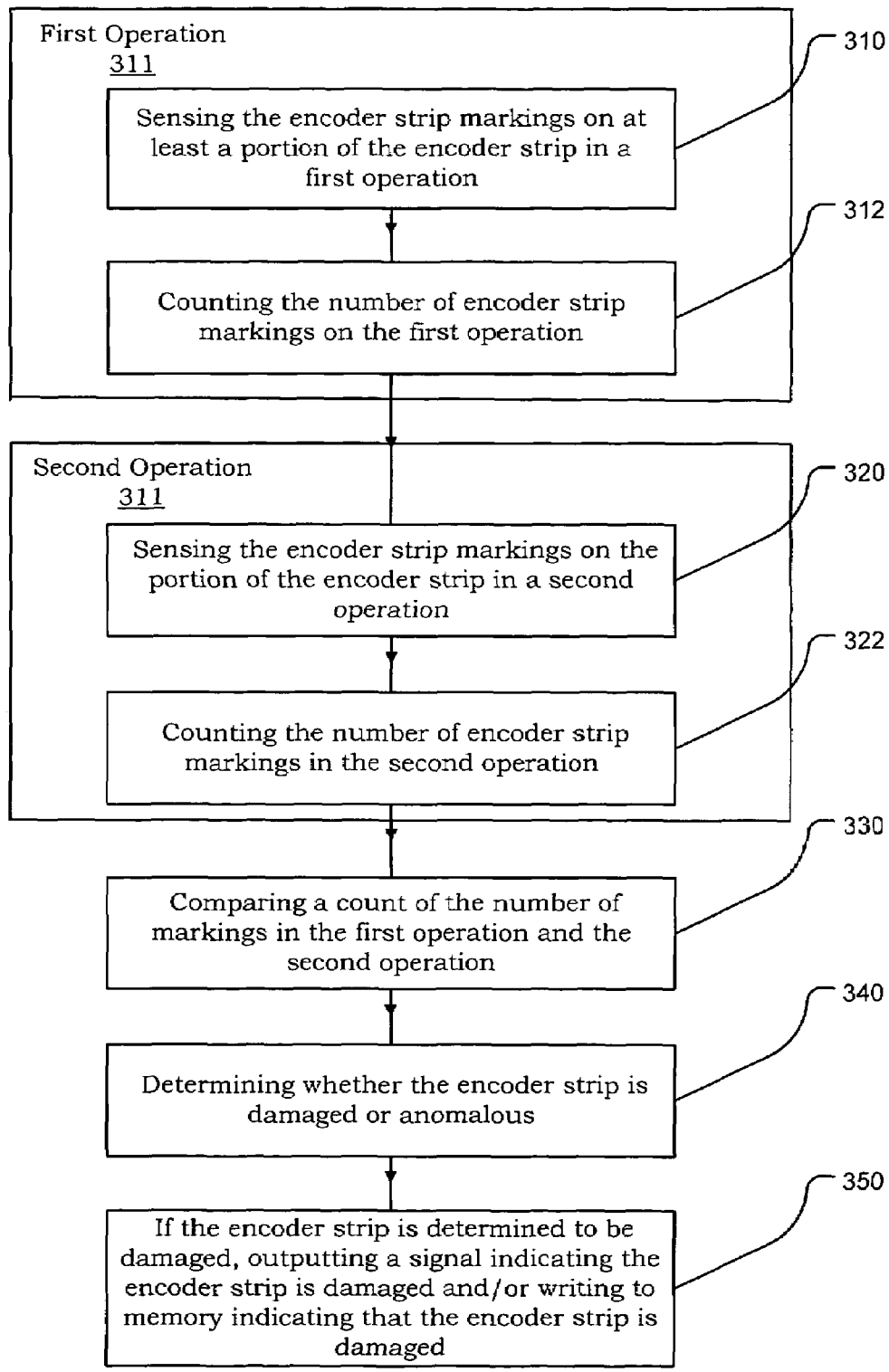
FIG. 3 is a flow chart showing an exemplary operation of a printing device, and exemplary instructions that a printing device computer executes in responding to a stored program.

Referring now to FIG. 3, a first operation 311 embodies the actions 310 and 312, and a second operation 321 embodies the actions 320 and 322. In the first operation 311, at 310, the encoder strip reader 160 scans or senses the markings of at least a portion of encoder strip 150 as the carriage assembly translates. In 312, the number of markings are counted. The action 312 also comprises storing the marking counts for subsequent usage in a comparison. In an implementation, the sensing action 310 and the counting action 312 occur concurrently with a running count of the markings 155 being calculated after a marking 155 is sensed in action 310.

Actions 310 and 312 are carried out over an identified portion of the encoder strip 150, resulting in a count that represents the number of marks traversed by the carriage assembly as it traverses over this portion. In one implementation, this portion comprises the entire part of the encoder strip 150 that is traversed by a full translation of the carriage assembly 110 along the guide rail 120.

In an exemplary implementation, the first operation 311 is initiated during the initial calibration of the printer device 100, wherein the breadth of carriage assembly translation is determined by the quantity of traversed marks on the encoder strip 150. Generally, the calibration procedure involves moving the carriage between its two extremes and counting the number of encoder strip marks that are traversed by the carriage between these two extremes. The count is stored in the memory system 220, for use in calibrating the printing device 100 to the breadth of the carriage assembly translation for a particular printing device 100.

In one implementation, the initial calibration of the printing device 100 is performed before the printing device 100 is transferred to a user, commonly as part of the manufacturing process of the printing device 100. In this initial calibration, a pre-set scan axis calibration will be stored in the memory system 220. In another implementation, the first operation 311 is initiated by an human operator command from the user input interface 235.

An action 320 performed by reader 160 of sensing the markings 155 on the encoder strip 150 over the same portion of the encoder strip sensed in the first operation. In 322, the sensed markings are counted. The action 322 includes a storing of the count in the control circuit 170. In one implementation, the sensing action 320 and the counting action 322 occur concurrently with a running count of the markings 155 being calculated after the markings 155 are sensed The encoder strip reader 160, and the control circuit 170 combination, sense and count each marking as described with reference to FIGS. 1 and 2 above.

In one implementation, the action 320 is initiated by a human operator command from the user input interface 235. In another implementation, the action 320 is initiated at a time determined by the control circuit 170. In an implementation, the action 320, is initiated during the power-on operation of the printing device 100, power-on operation herein referring to when the device is powered on.

An action 330 includes comparing the number of markings counted by the first operation in 312 with the number of markings counted by the second operation in 322. An action 340 follows 330, and includes determining whether the encoder strip 150 is damaged based on the comparison of action 330. If the number of detected markings in the first operation differs from the number of markings detected in the second operation, the encoder strip 150 is determined to be damaged.

The operation portrayed in FIG. 3 further comprises an action 350 of outputting a signal indicating that the encoder strip is damaged as determined in 340 above. In a printing device 100 including an indicator system, the indicator system in an implementation can include an at least one indicator (or status) light, and in another implementation, a sound generator or the like. The action 350 also includes writing status data to system memory 220. The status data indicates whether encoder strip 150 has been determined to be damaged. Depending on the particular implementation, action 350 might also include sending a signal to the service function.

Figure 4:
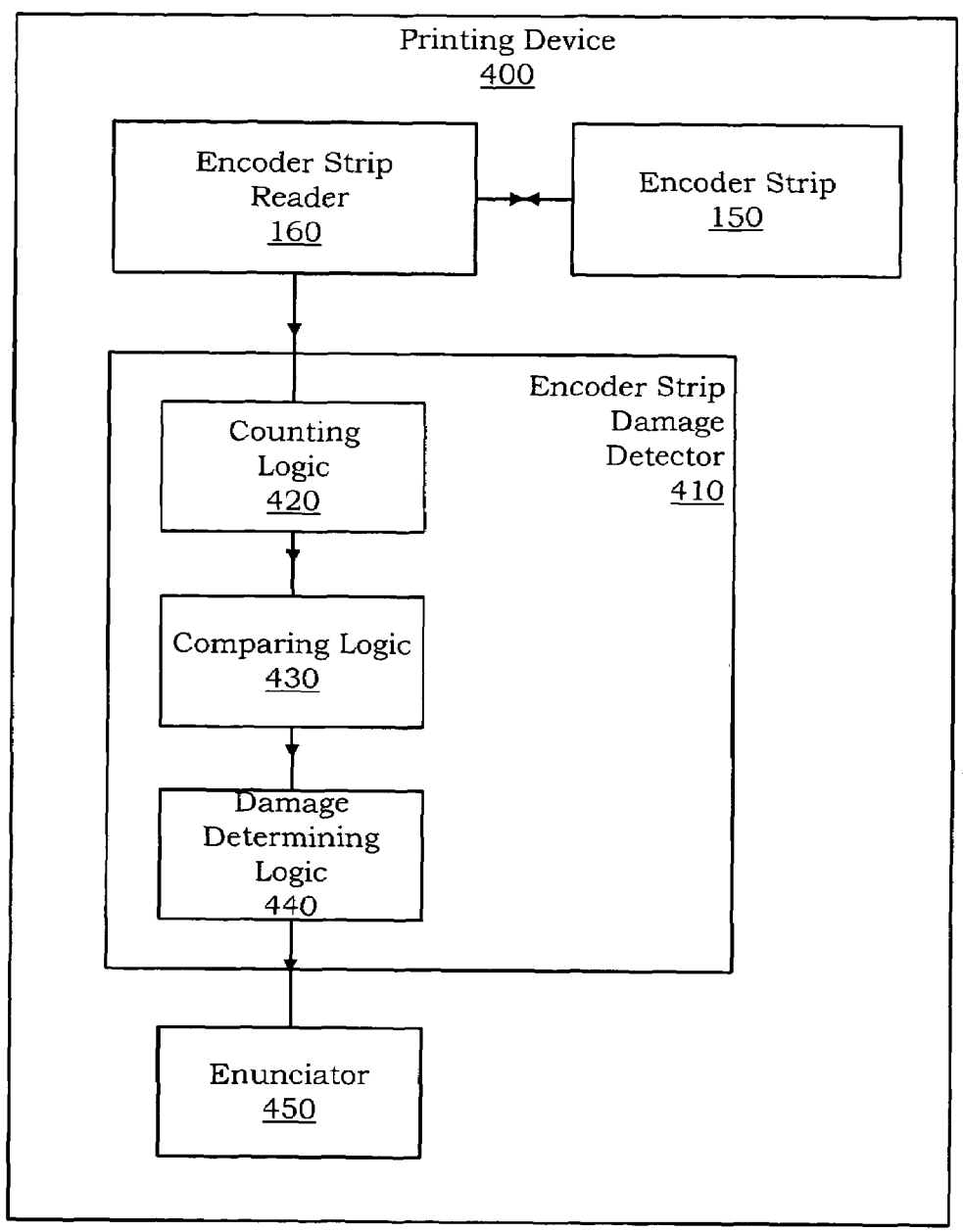
FIG. 4 is a block diagram of an exemplary implementation of an encoder strip damage detector, a printing device encoder strip, and an encoder strip reader.

FIG. 4 shows an aspect of the printing device portrayed with reference to FIG. 1. Now referring to FIG. 4, a printing device 400 includes an encoder strip damage detector 410 to determine whether the encoder strip 150 is damaged. The encoder strip damage detector 410 determines whether the encoder strip 150 is damaged based on changes in a count of the markings 155 detected by the encoder strip reader 160 over time. The encoder strip damage detector 410 includes a counting logic 420 to count at two separate times the number of markings on the encoder strip 150 at a first sensing operation (311 FIG. 3) time and at a subsequent second sensing operation (321 FIG. 3) time. The encoder strip damage detector 410 includes a comparing logic 430 to compare the two separate counts, a first count and a subsequent second count, from the first operation and from the second operation respectively. The encoder strip damage detector 410 includes a damage determining logic 440 to determine if the encoder strip 160 is damaged based on changes in the count over time. The encoder strip damage detector 410 determines that the encoder strip 150 is damaged when the first count differs from the second count.

Referring still to FIG. 4, the first count is taken during a calibration of the printing device 400. The second count is taken either during a power-on of the printing device 400, or is commanded separately by a human operator.

The encoder strip damage detector 410 can be implemented alternatively by a programmed computer, a dedicated circuit, or a combination of a programmed computer and a dedicated circuit. If the encoder strip damage detector 410 is implemented as a programmed computer, the implementation can embody the computer 210 (FIG. 2) and the stored program 222 (FIG. 2), and the counting logic 420, the comparing logic 430, and the damage determining logic 440, is embodied by a computer responding to a program.

In the described implementation, encoder strip damage detector 410 is configured to output a signal indicating an alert of damage to the encoder strip 150 in response to determining that the encoder strip 150 is damaged. In this implementation, the printing device 100 includes an enunciator 450 that responds to the signal by emitting a notification of the damaged encoder strip 150. Furthermore, the printing device 400 optionally includes a service function or an interface with a service function 240 to receive the signal. In an implementation, the printing device 400 includes a memory system 220, and the encoder strip damage detector 410 is to store in the memory system 220 a data indicating a damaged encoder strip 150, if the encoder strip damage detector 410 determines that the encoder strip 150 is damaged.

Figure 5:
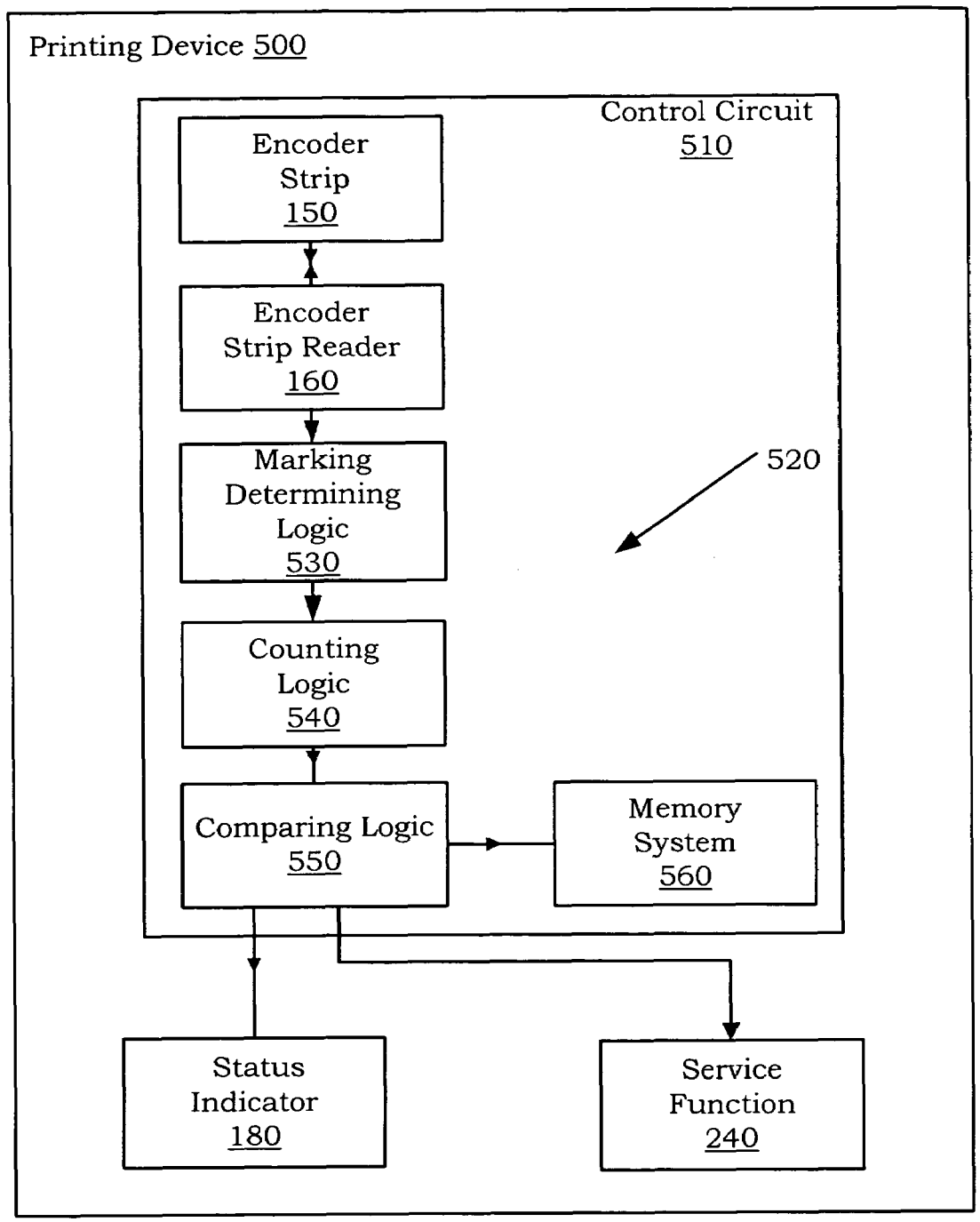
FIG. 5 is a block diagram of an exemplary implementation of a printing device encoder system.

FIG. 5 shows an aspect of the printing device portrayed with reference to FIG. 1. Now referring to FIG. 5, a printing device 500 includes an encoder system 510. The encoder system 510 includes the encoder strip 150, the encoder strip sensor (reader) 160, and a control logic 520. The control logic 520 determines damages to or anomaly in the encoder strip 150, based on a change in the number of detected markings 155 by the encoder strip sensor 160 in at least a portion of the encoder strip 150 over time. The control logic 520 is in communication with the encoder strip sensor 160. The control logic 520 includes a marking determining logic 530, a counting logic 540, and a comparing logic 550. The marking determining logic 530 is to determine a marking 155 from the encoder strip 150 sensed by the encoder strip reader 160. The counting logic 540 counts the number of markings on an encoder strip 150 in each of two separate over time encoder strip reading operations, a first operation and a subsequent second operation. The comparing logic 550 compares each of the two separate counts to determine changes in a count of the markings over the time. In one implementation, the marking determining logic 530 is a sub-circuit of the encoder strip reader 160. Each logic 530, 540, and 550 is implemented alternatively by a dedicated circuit finite, a computer that responds to a stored program, or a combination of a programmed computer and a dedicated circuit. If the logic 530, 540, and 550 is implemented as a programmed computer, the implementation can embody the computer 210 (FIG. 2) and the stored program 222 (FIG. 2).

Referring still to FIG. 5, the first count is taken during a calibration of the printing device 500, and the second count is alternatively during a power-on of the printing device 500, or is commanded separately by a human operator. In an implementation, the control logic 510 is to output a signal indicating a change in the number of detected markings in response to the comparing logic 550 determining that the quantity of markings indicated in the first operation and in the second operation are different for a status indicator 180 and/or a service function 240. In an implementation, the encoder system 510 includes a memory system 560, and the comparing logic 510 is to store a data indicating a damaged or changed encoder strip 150 if the comparing logic 550 determines that the encoder strip 150 is damaged.

This invention has been described with reference to a printing device implementation. However, the scope of this invention is defined in the accompanying claims. Specifically, this invention includes a device having a moving mechanism that makes use of an encoder strip, such as specifically a printing device, and specifically a scanning device.

While this invention has been explained with reference to the structure disclosed herein, it is not confined to the details set forth and this invention is intended to cover any modifications and changes as may come within the scope of the invention as defined in following claims.

What is claimed is:

1. A device with a movable mechanism, comprising:
  an encoder strip having markings to indicate a position of the mechanism;
  an encoder strip reader to detect the markings; and
  an encoder strip damage detector configured to determine whether the encoder strip is damaged based on changes in a count of the markings detected by the encoder strip reader over time.

2. The device recited in claim 1 wherein said device comprises a printing device.

3. The device recited in claim 1 wherein said device comprises a scanning device.

4. The device recited in claim 1 wherein the markings are optically readable markings.

5. The device recited in claim 1 wherein the encoder strip reader moves with the moveable mechanism.

6. The device recited in claim 1 embodied as a shuttle type printing device.

7. The device recited in claim 1 further including a memory, and wherein the encoder strip damage detector is configured to store data in the memory indicating a damaged encoder strip if the encoder strip damage detector determines that the encoder strip is damaged.

8. An encoder system comprising:
  an encoder strip having markings to indicate a position of a moveable mechanism;
  an encoder strip sensor having a sensor output that is responsive to sense the encoder strip markings; and
  a control circuit responsive to the encoder strip sensor to determine whether the encoder strip is damaged based on a difference in the sensor output in at least two separate sensing operations performed over the same portion of the encoder strip based on a change of count of the markings over time.

9. The encoder system recited in claim 8 wherein said system is embodied as at least one of a printing device or a scanning device.

10. The encoder system recited in claim 8 wherein the markings are indicia.

11. The encoder system recited in claim 8 wherein the control circuit includes a processor and a stored program, and the processor determines a change in the number of markings by executing the stored program.

12. The encoder system recited in claim 11 wherein the stored program includes instructions to cause the processor to at least one of store an indication in a memory if there is a change in the number of detected markings, or output a signal indicating if there was a change in the number of detected markings.

13. A printing device comprising:
  means for sensing markings on an encoder strip over time, and
  means for detecting anomalies in the sensed markings by counting the sensed markings over time.

* * * * *